Sept. 28, 1971     H. A. ROBINSON     3,608,290
WEED AND BRUSH CUTTING APPARATUS
Filed May 16, 1969     3 Sheets-Sheet 1

INVENTOR.
HARRY A. ROBINSON
BY
ATTORNEYS

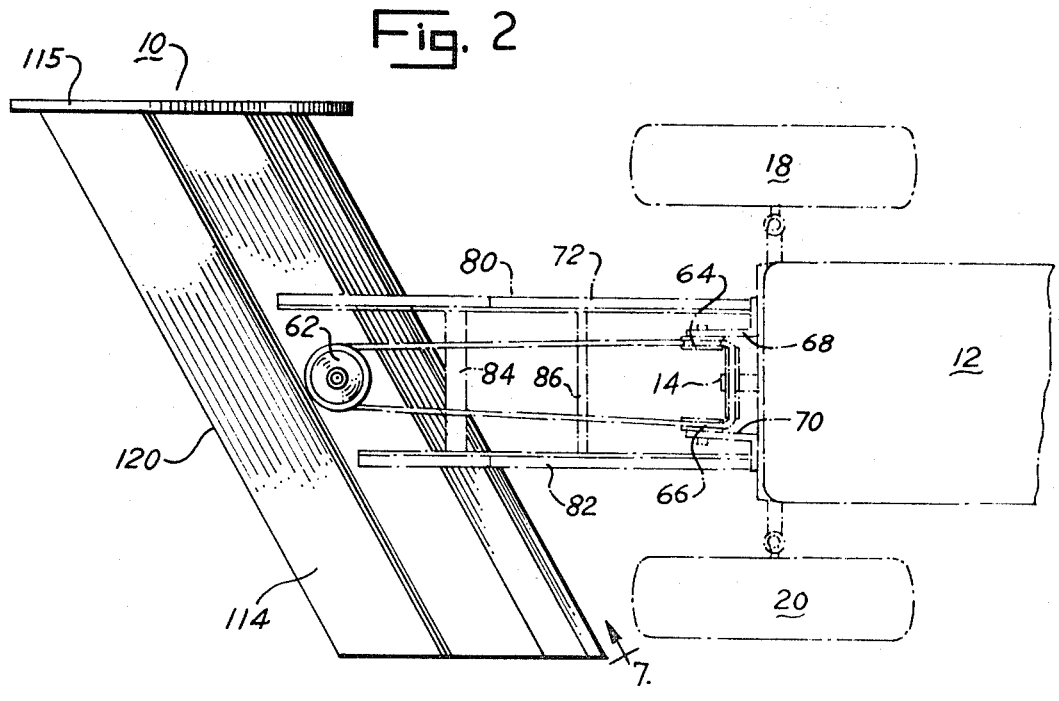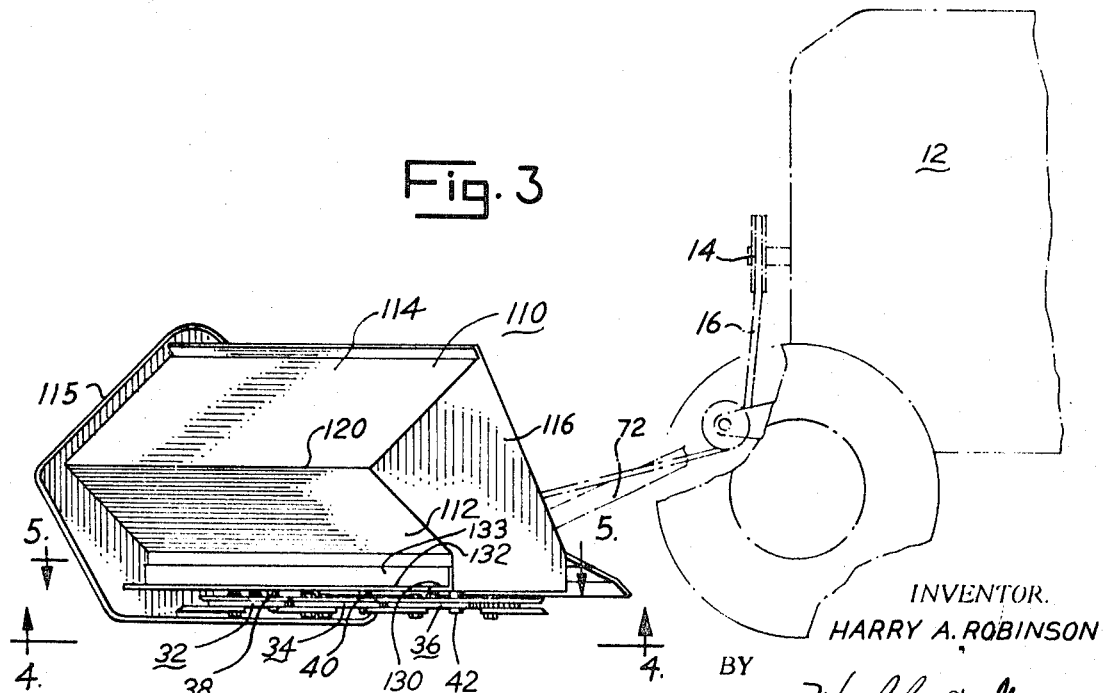

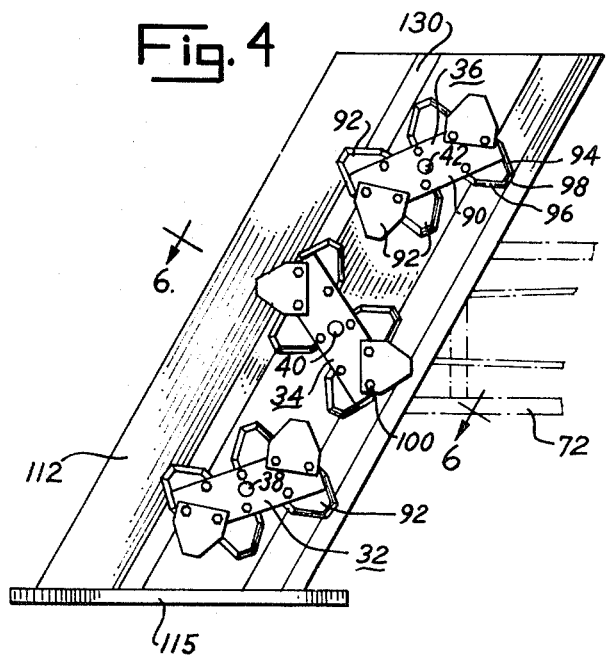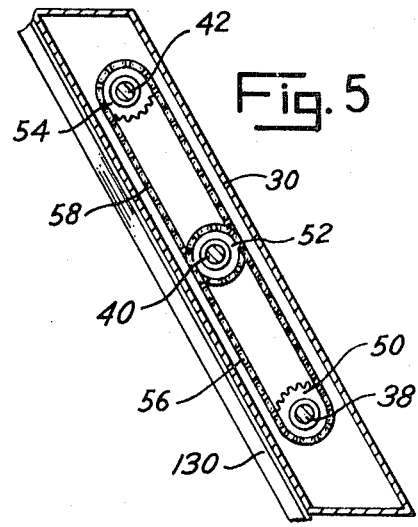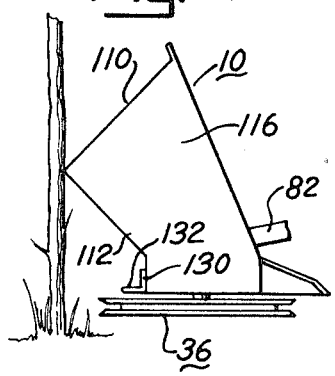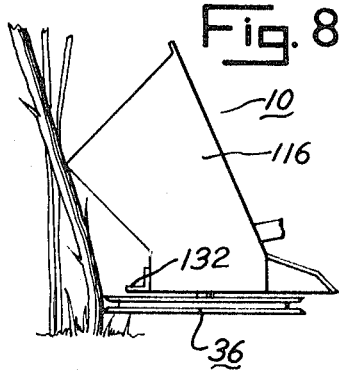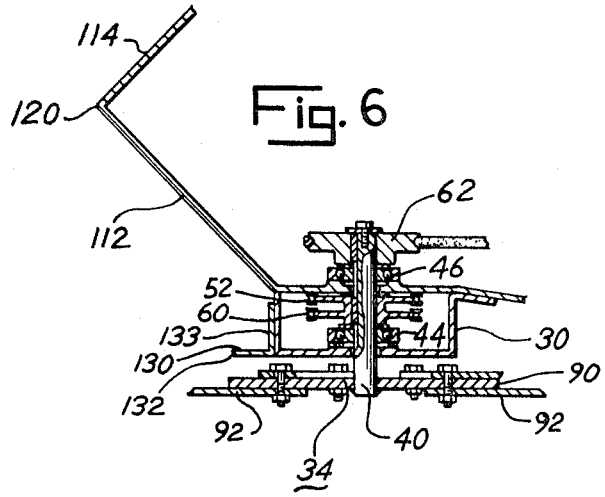

United States Patent Office 3,608,290
Patented Sept. 28, 1971

3,608,290
WEED AND BRUSH CUTTING APPARATUS
Harry A. Robinson, Elkhart, Ind.
(P.O. Box 321, Avilla, Ind. 46710)
Filed May 16, 1969, Ser. No. 825,364
Int. Cl. A01d 57/26
U.S. Cl. 56—192            10 Claims

ABSTRACT OF THE DISCLOSURE

A weed and brush cutting apparatus having one or more horizontally rotatable cutters mounted beneath a supporting body, and an angularly disposed pusher extending forwardly beyond the cutters for pushing the weeds and brush forward prior to the cutting operation. A conveyor means is disposed above and adjacent to the cutter blades for receiving the cut material and moving the material to one side of the apparatus. The apparatus is normally mounted on the front of a tractor or other vehicle which provides the power for driving the weed and brush cutting apparatus.

---

Power mowers are extensively used for mowing grass and will satisfactorily cut weeds provided they are not large or thick, and will cut brush sprouts while they are small and tender. However, in the past, it has generally been the practice and usually a necessity to cut the larger growth of brush with either power or hand saws or axes. Attachments of the type generally illustrated in my Pat. No. 3,115,741, are often used on farm and suburban tractors for mowing grass and weeds and to clean areas where brush has started to grow, but these attachments have generally been unsatisfactory or totally inoperable when brush becomes brush size with relatively thick stems and trunks. Attachments in the past designed for cutting this thicker material usually could not be handled by standard size tractors, and particularly smaller garden and lawn type tractors normally referred to as suburban tractors. Hence, there has not been a standard attachment for the small tractors which can conveniently be mounted on and handled by the tractor and which will continuously perform the cutting operation and effectively mow the thicker brush growth. It is therefore one of the principal objects of the present invention to provide a relatively simple and compact attachment for tractors for cutting weeds and brush, which is so constructed and designed that it bends the weeds and brush forward away from the cutting blades to facilitate cutting, particularly of relatively large stems and trunks of the brush, and which conveys the cut weeds and brush to one side and prevents the cut material from falling into the path of the tractor and attachment.

Another object of the invention is to provide, in a weed and brush cutting apparatus having rotary cutters, a means for placing the material to be cut on a strain where it is held firmly for the cutting blades and for removing the cut material immediately from the blades so that the blades are not impeded in their operation by the cut material.

Still another object of the invention is to provide a conveyor means of simple construction and operation for a cutting apparatus of the aforementioned type, which in effect lifts the cut weeds and brush from the cutting blades and, in conjunction with the forward motion of the apparatus, moves the cut material to and discharges it along the side of the apparatus.

A further object is to provide a weed and brush cutting apparatus which effectively engages and severs the standing weeds and brush material during the cutting operation, yet which includes a protective means that prevents the blades from cutting or damaging large and up-standing objects or from easily being contacted accidentally by someone in front of the apparatus.

Additional objects and advantages of the invention will become apparent from the following description and accompanying drawings, wherein:

FIG. 2 is a top plan view of a weed and brush cutting apparatus, showing it connected to the front end of a tractor, the tractor being shown in phantom lines;

FIG. 3 is an elevational view of the present weed and brush cutting apparatus, as viewed from a side and front angle, and illustrating a tractor in phantom lines;

FIG. 4 is a bottom view of the present weed and brush cutting apparatus;

FIG. 5 is a horizontal cross-sectional view of the weed and brush cutting apparatus as seen on line 5—5 of FIG. 3;

Figure 1:
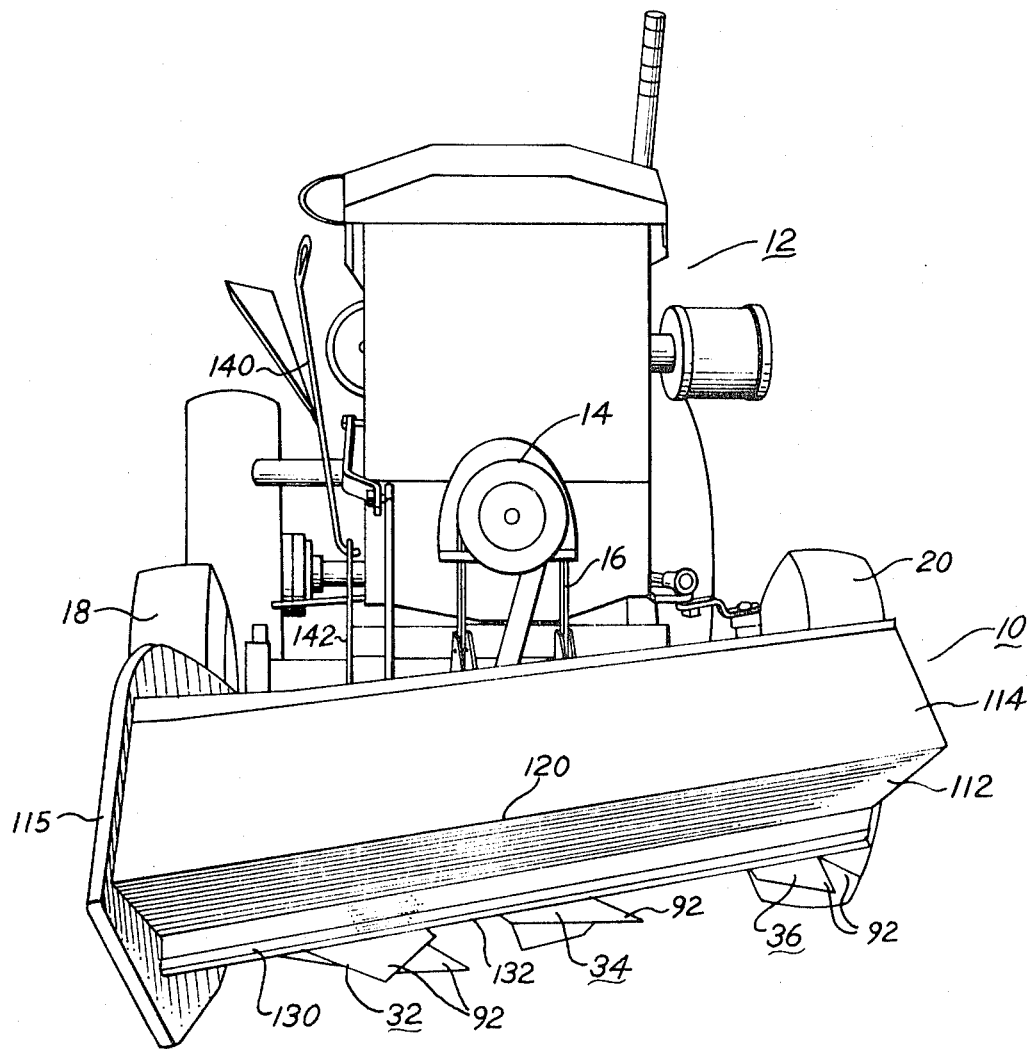
FIG. 1 is a front elevational view of a weed and brush cutting apparatus, showing the apparatus mounted on a conventional suburban tractor.

FIG. 6 is a vertical cross-sectional view of the weed and brush cutting apparatus, the section being taken on line 6—6 of FIG. 4; and FIGS. 7, 8 and 9 are views of the end of the present weed and brush cutting apparatus as indicated by line 7—7 of FIG. 2, the three figures illustrating the manner in which the present weed and brush cutting apparatus operates.

Referring more specifically to the drawings and to FIG. 1, numeral 10 indicates generally the present apparatus and 12 a conventional tractor on which the apparatus is mounted. The present weed and brush cutting apparatus may be designed to operate on either a suburban or a farm tractor, and the fixtures for attaching the apparatus to the particular tractor may be varied from one model or from one make to another to properly mount the apparatus on the particular tractor.

In the embodiment illustrated in the drawings, the tractor is provided with a drive shaft and pulley assembly 14 on the front thereof, and the apparatus is driven by the pulley through a belt 16, in a manner more fully described hereinafter. The apparatus is preferably mounted directly in front of the tractor and spaced outwardly from the front wheels 18 and 20, which not only steer the tractor but also maneuver the apparatus into proper cutting position. Since the tractor is considered conventional, it will not be described in further detail herein, and while the tractor has been used as an illustration for the source of power for the present apparatus, the apparatus may be used on other types of vehicles, such as utility trucks, or it may be mounted on a chassis of its own to form a complete operating unit.

The present weed and brush cutting apparatus consists of a base 30 forming a housing and support for the drive mechanism of rotating cutters 32, 34 and 36 mounted on vertical shafts 38, 40 and 42, respectively. The three shafts extend upwardly through body 30 and are journalled in lower and upper bearings 44 and 46 supported by body 30. The three shafts are driven in unison by sprockets 50, 52 and 54 on shafts 38, 40 and 42, respectively, and by chain 56 trained on sprockets 50 and 52, and chain 58 on sprocket 54 and on a second sprocket 60 on shaft 40. The two sprockets on shaft 40 are driven by a sheave 62 secured to the upper end of shaft 40, the sheave being driven by belt 16 trained on sheave 14 and on sheaves 64 and 66 and sheave 62. The two sheaves 64 and 66 are supported by brackets 68 and 70, respectively, on the frame 72 interconnecting the tractor with the cutting apparatus.

The frame is rigidly or pivotedly connected to the front axle assembly of tractor 12, normally in such a manner that it can easily be detached. Any suitable frame structure 72 may be used to support and guide the apparatus, the frame structure shown on the drawings consisting of side members 80 and 82 and cross-members 84 and 86, the forward end of the frame being rigidly connected to the upper part of the body 30. As mentioned previously herein, the connecting frame structure 72 may be varied in order to adapt the apparatus to various types and makes of tractors or other vehicles.

Cutters 32, 34 and 36 are identical in construction and operation, and each consists of a horizontal member 90 having a plurality of generally triangular shaped blades 92 rigidly attached to the horizontal member. The blades have angular edges 94 and 96 and a sharpened outer end 98, all three of which perform the cutting operation as the cutters rotate rapidly on their respective shafts. The blades are secured to the member by a plurality of bolts 100, or any other suitable securing means.

One of the important features of the present invention is the construction of housing 110 mounted on and secured to body 30. The housing includes a forwardly projecting panel 112 extending substantially the full distance across the front of the apparatus, and an upwardly and rearwardly projecting panel 114 secured to the forward edge of panel 112. These two panels are held firmly in the foregoing position by end panels 115 and 116 secured to the two panels by welding or other suitable means. Either of the two panels or the two panels together form a weed and brush pusher, primarily at the point of juncture 120 which makes the initial contact with the weeds and brush being cut. The continued movement of the apparatus forwardly pushes the brush forward so that it is bent forwardly when the cutting blades contact the stalks, stems or trunks of the material being cut. This operation is illustrated in FIGS. 7, 8 and 9. A frame having an angularly positioned bar in place of juncture 120 may be used to perform the pushing operation.

Another important feature of the present invention is the conveyor mounted at the lower part of body 30 and the housing structure. The conveyor includes channel 130 near the lower edge of panel 112, which forms a forwardly extending flange or lip 132, projecting forwardly over a substantial portion of the three cutters. The upper surface of flange 132 forms the conveyor on which the lower ends of the cut weeds and brush ride while the apparatus is moved forwardly. In order to move the brush along the front of the apparatus to the right hand side thereof, as viewed in FIG. 3, the housing is tapered or set at an angle, as illustrated in FIGS. 2 and 4, extending at an angle rearwardly from side panel 115 to side panel 116. This angular position with respect to the forward movement of the apparatus causes the cut weeds and brush resting on conveyor 130 to move from left to right, as viewed in FIG. 3, along the front panel 112 and along the upper surface of flange 132 of channel member 130. The rear side 133 of said member 130 forms an abutment for the lower ends of the cut stems and assists in moving the material to one side. When the material reaches the end of flange 132, it falls outwardly therefrom into well defined rows and sufficiently away from the tractor and cutting apparatus so that it does not cause any interference with the further cutting or maneuverability of the tractor.

The forwardly projecting housing affords protection to objects that would otherwise be damaged by the blade by preventing the blade from coming in contact with the objects. It likewise provides a safety shield or bumper to individuals who may be accidentally contacted by the apparatus. While the housing consisting of the two panels 110 and 112 is the preferred construction, a frame configuration in which the solid panels are not used may perform satisfactorily, either alone or in combination with the conveyor arrangement disposed immediately above the cutter and extending angularly to one side.

In the operation of the present weed and brush cutting apparatus, the apparatus is mounted on the front of the tractor in the manner illustrated in FIGS. 1 and 2, and the operation is controlled by a hand lever 140 and linkage 142 connecting the lever to frame 72. After the tractor motor has been started and the cutters are placed in operation, the tractor is driven forwardly into the weeds and/ or brush to be cut. As the apparatus advances, the bumper structure 120 engages the trunks, stems and stalks, as illustrated in FIG. 7, pushing the weeds and brush forwardly, as illustrated in FIG. 8, thereby stressing the stems, stalks or trunks on the side adjacent the approaching cutters. As the cutters reach these, the fibers thereof are readily severed, thus facilitating substantially the speed with which the cutting operation can be performed. As the stems, stalks and trunks are severed, they automatically ride over the cutting blades onto the conveyor channel 130 and are held in the position illustrated in FIG. 9 by the standing uncut weeds and brush forward of the apparatus. Further movement of the apparatus forwardly causes the cut material to move angularly along the front of the housing and on channel conveyor 130 to the right hand side, as viewed in FIG. 3, where the material is discharged in rows as previously described herein. The apparatus may be maneuvered into various positions, advanced forwardly, cutting standing weeds and brush and withdrawing to different locations, or the apparatus and tractor may be driven in consecutive rows along the edge of the standing weeds and brush. Because of the side discharge operation of the apparatus, the cut material does not interfere with the continued operation of the apparatus.

While only one embodiment of the present weed and brush cutting apparatus has been described in detail herein, various changes, including different sizes and a different number of cutters may be made without departing from the scope of the invention.

I claim:

1. A weed and brush cutting apparatus comprising a body, a horizontally rotatable cutter means mounted below said body, a means for driving said cutter means, a structure disposed in front of said body and above said cutter means and positioned at an angle greater than ninety degrees in one lateral direction to the forward direction of travel of said apparatus for engaging and pushing forwardly the weeds and brushes being cut, and a conveyor having a substantially horizontally extending elongated bottom member and an elongated substantially vertically extending rear member disposed above and in closely spaced relation to said cutter means for receiving the lower ends of the cut weeds and brush and for supporting and moving said cut weeds and brush to one side of the apparatus.

2. A weed and brush cutting apparatus as defined in claim 1, in which said cutter means consists of a plurality of laterally spaced cutters mounted below said body.

3. A weed and brush cutting apparatus, as defined in claim 1, in which said structure disposed in front of said body and above said cutter means consists of a forwardly and upwardly extending panel.

4. A weed and brush cutting apparatus as defined in claim 3, in which a rearwardly and upwardly extending panel is joined to the upper edge of said first mentioned panel.

5. A weed and brush cutting apparatus as defined in claim 4, in which end panels are secured to said first two mentioned panels to form a rigid structure.

6. A weed and brush cutting apparatus as defined in claim 1, in which said bottom member is a flange extending generally parallel to said structure disposed in front of said body and having an open end at one side of said apparatus.

7. A weed and brush cutting apparatus as defined in claim 1, in which said bottom member extends generally parallel to said structure disposed in front of said body.

8. A weed and brush cutting apparatus as defined in claim 4, in which said bottom member is a shelf-life member extending parallel to said structure disposed in front of said body.

9. A weed and brush cutting apparatus as defined in claim 8, in which said cutter means consists of a plurality of laterally spaced cutter means mounted below said body.

10. A weed and brush cutting apparatus as defined in claim 2, in which said cutter means are mounted on vertically disposed shafts, sprockets are mounted on said shafts, and chains interconnect said sprockets for driving said cutters in unison.

References Cited

UNITED STATES PATENTS

| | | | |
|---|---|---|---|
| 2,576,886 | 11/1951 | McCoy | 56—192X |
| 2,577,906 | 12/1951 | Miller et al. | 143—43.34 |
| 2,624,380 | 1/1953 | Haynes | 143—43.34 |
| 2,633,164 | 3/1953 | Kissner et al. | 144—34.1 |
| 2,832,382 | 4/1958 | Lahar | 56—229X |
| 3,115,741 | 12/1963 | Robinson. | |
| 3,415,296 | 12/1968 | Frankenburg et al. | 56—229X |

LOUIS G. MANCENE, Primary Examiner

J. A. OLIFF, Assistant Examiner

U.S. Cl. X.R.

56—503